Nov. 19, 1935.  H. HUEBER  2,021,857
AUXILIARY POWER SUPPLY FOR WINDSHIELD CLEANERS
Filed March 11, 1929  2 Sheets-Sheet 1

Inventor
Henry Hueber
by Barton A. Bean Jr.
Attorney

Nov. 19, 1935. H. HUEBER 2,021,857
AUXILIARY POWER SUPPLY FOR WINDSHIELD CLEANERS
Filed March 11, 1929 2 Sheets-Sheet 2
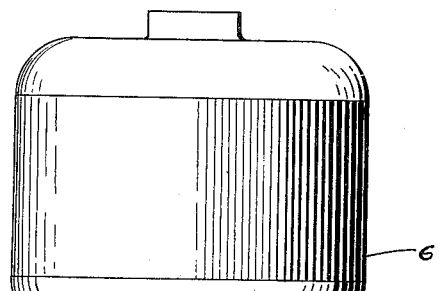
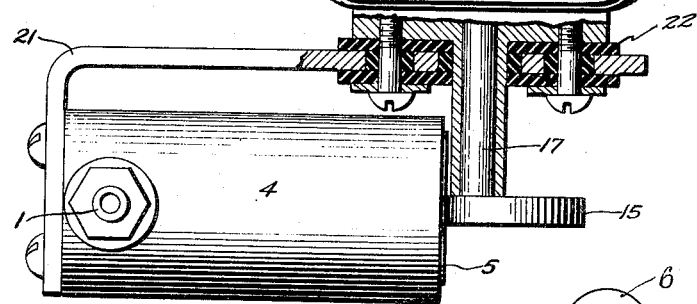
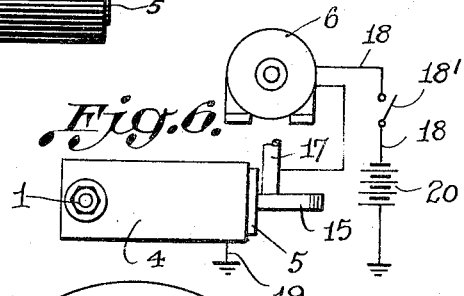
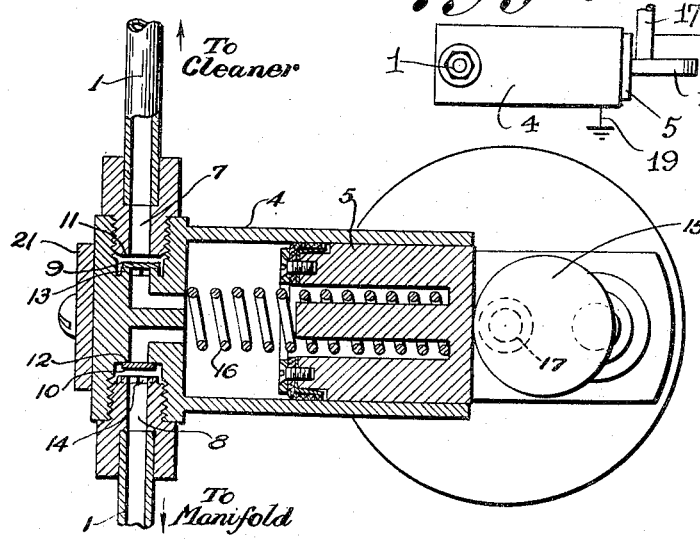
Inventor
Henry Hueber
by Barton A. Bean Jr.
Attorney Patented Nov. 19, 1935

2,021,857

UNITED STATES PATENT OFFICE 2,021,857

AUXILIARY POWER SUPPLY FOR WINDSHIELD CLEANERS

Henry Hueber, Buffalo, N. Y., assignor to Trico Products Corporation, Buffalo, N. Y.

Application March 11, 1929, Serial No. 346,095

7 Claims. (Cl. 60—60)

This invention relates to the fluid pressure or so-called suction-operated windshield cleaner art and primarily to mechanism or apparatus for supplementing the power supply to windshield cleaners, particularly the supply of negative pressure as furnished by the intake manifold for the actuation of suction-operated windshield cleaners.

It is a well known fact that the available supply of suction which is furnished by the intake manifold for the operation of accessories varies considerably during the normal operation of a motor vehicle; that with the throttle wide open and with the engine laboring, as when pulling up a grade, the available degree of suction is very low, being insufficient at times to operate a windshield cleaner, while with the throttle closed the available suction is quite sufficient for the practical operation of the windshield cleaner. Attempts have been made to modify an insufficient supply of negative pressure by intensifying the same to a more or less practical degree but such attempts have been restricted to means other than from a positive and mechanical agency.

The present invention is found to reside in the provision of auxiliary means for automatically operating the windshield cleaner upon the failure of its main source of power; in the introduction of means into the suction line for acting in a positive manner to boost the negative pressure or suction to a practical degree when the supply furnished by the intake manifold is deficient; in the provision of a suction pump which is automatically set in operation upon the main supply of negative pressure becoming deficient; in introducing a suction-producing mechanism into the suction line between the windshield cleaner and the intake manifold in a manner so that the suction line will pass through the suction-producing mechanism as a part thereof, the connection between the windshield cleaner motor and the mechanism entering the latter at the intake side and the connection between the mechanism and the intake manifold leaving through the exhaust side whereby the mechanism when set in operation will act to intake the air through the windshield cleaner motor and thereby provide the desired negative pressure therefor, and will exhaust such air into the intake manifold.

The invention further has for its aim to provide a novel control for the automatic operation of the suction-producing mechanism; and to provide a suction pump operated by an electric motor which is included in a circuit automatically opened and closed upon the rise and fall of the negative pressure above and below a predetermined degree.

Still other objects of the invention are to provide a novel unit for the auxiliary production of negative pressure; to make the piston responsive to the manifold-supplied suction and normally movable thereby to an inoperative position; to provide yieldable means for urging the piston into operative relation with its drive when the available suction is deficient; and to effect operation of its drive when the piston is operatively related thereto.

In the drawings,

Fig. 3 is a top plan view, partly in section and partly in elevation of the auxiliary unit.

Fig. 4 is a vertical longitudinal section through the pump part of the auxiliary unit.

Fig. 5 is a detailed perspective view of a part of the pump.

Fig. 6 is a diagrammatic view showing the electrical connections of the apparatus.

Figure 1:
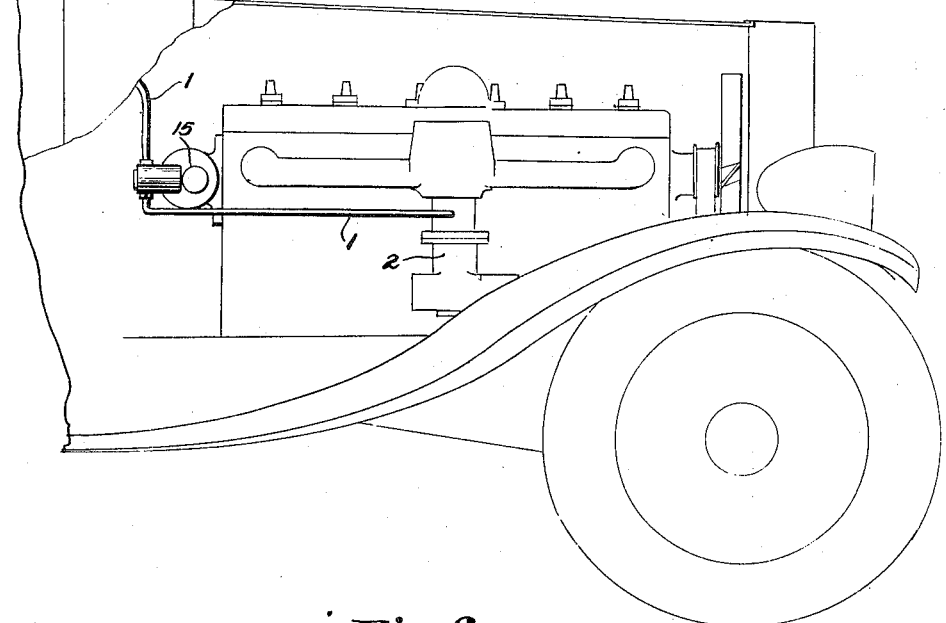
Fig. 1 is a fragmentary side elevation of a motor vehicle equipped with the auxiliary suction producer in the suction line between the intake manifold and the windshield cleaner.
Figure 2:
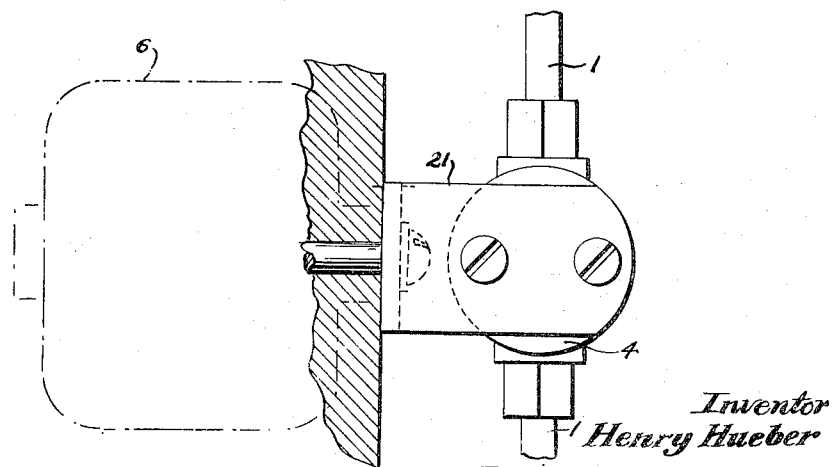
Fig. 2 is an elevation depicting the pump cylinder in end view and illustrating the mode of mounting the auxiliary unit.

Referring more in detail to the accompanying drawings, the numeral 1 designates the suction line leading from the intake manifold 2 of the motor vehicle engine to the motor 3 of the windshield cleaner, the latter being obviously of the fluid pressure type.

Auxiliary means are provided for supplying operative fluid pressure to the cleaner motor when the main source fails. Negative fluid pressure is preferably supplied by this auxiliary means or booster unit to intensify and supplement the main supply. To this end, the unit is interposed in the suction line and, in its preferred embodiment, comprises a pump cylinder 4, a piston 5 and a power drive 6. The cylinder is provided with an intake port 7 and an exhaust port 8 properly controlled by valves 9 and 10 which are here shown as being disc-shaped and adapted to engage their respective seats 11 and 12 to effect exhaustion or withdrawal of air from the windshield cleaner motor 3. Stop lugs 13 and 14 prevent the valves from closing the companion ports of their respective chambers.

The power drive embodies a cam 15 for operating the piston 5, the piston being urged toward, and into contact with, the cam by a spring 16 although it is adapted for movement away therefrom under the influence of negative pressure in the suction line 1 above a predetermined degree. The cam 15 is fixed on its shaft 17 which in turn is driven preferably through reduction gearing (not shown) by an electric motor the circuit of which is automatically closed on the fall of the manifold suction below the predetermined efficiency normal. One way of accomplishing this automatic operation of the auxiliary unit is by conducting electrical energy from a source 20 through the circuit wire 18 to the electric motor, then through the shaft 17, the cam 15, piston 5, cylinder 4, by a wire 19 to the ground and back to the source of electrical energy 20. By this arrangement it will be observed that the electric circuit is closed when the piston 5 is in mechanical contact with its driving element 15, but that this condition is not permitted to exist unless the manifold-supplied suction is so weak as to be overcome by the spring 16 when the latter will force the piston outwardly into contact with the cam 15. With the electric circuit closed, the cam will actuate the piston to provide the requisite amount of suction or negative pressure sufficient to practically operate the windshield cleaner, the pump acting to withdraw atmospheric air through the windshield cleaner, causing operation of the latter, and expelling such withdrawn air into the intake manifold in substantially the same volume that air is drawn thereinto during the normal operation of the windshield cleaner and when the auxiliary unit is not operating. When the manifold suction is sufficient in itself to practically operate the windshield cleaner, the piston 5 becomes responsive to this manifold-supplied suction and is withdrawn thereby out of contact with the operating cam 15 so as to effect a break in the circuit for the auxiliary unit. The unit may be rendered inoperative, as by a manual switch 18'.

The unit is compact in its nature and may be supported on the engine block as by a bracket 21, care being taken to insulate the electric motor from the ground of the electric circuit. Such insulation may be disposed as indicated at 22.

The incorporation of this booster or auxiliary unit into the windshield cleaner system provides for the positive production of negative pressure or suction to intensify or supplement an otherwise deficient manifold supply whereby the operation of the windshield cleaner is rendered substantially uniform. By providing adjustment for the spring 16, or by replacing the spring 16 with one of a different resiliency, the degree for the efficiency normal of the manifold suction may be varied and predetermined so that the operation of the unit will be effective upon the fall of the intake manifold suction below such degree of suction.

What is claimed is:

1. The combination with a fluid operated accessory, a suction line connecting the same to the intake manifold of the vehicle engine as a source of operating pressure, and an auxiliary negative-pressure-producer interposed in the suction line consisting of a suction pump, an electric circuit including a motor for driving said pump, and pressure-responsive means responsive to the manifold suction for automatically opening and closing said circuit to render said motor operative or inoperative.

2. A unit for supplying operating pressure to the fluid operated accessories of motor vehicles, comprising a cylinder connected in the fluid line leading to the accessory, a piston operable in the cylinder, a drive for the piston including an electric motor and electric circuit therefor, means for yieldably holding said piston in operative contact with its drive, said piston being movable from the drive in response to a predetermined operating pressure in the fluid line and cylinder connected thereto, and means for opening said electric circuit upon movement of the piston out of contact with its drive.

3. A fluid pump for a fluid pressure system, comprising a chamber, a pump member operable in the chamber to intake and expel fluid therefrom, an electrically actuated drive for said pump member, an electric circuit including said drive, said drive and said pump member having cooperating separable metallic parts electrically connected in said circuit and constituting a switch for opening and closing the latter, said metallic parts being separated by movement of said pump member in the chamber in response to abnormal pressure conditions in the system and chamber to thereby open the circuit to render the drive inoperative, and means for restoring electrical connection between said cooperating parts in the absence of such abnormal pressure conditions to again render the drive operative.

4. A pumping device including a casing, a piston operable in the casing, an electric motor drive having a drive part in detachable engagement with the piston, resilient means yieldably holding the piston in engagement with the drive part, an electric circuit for the motor including the drive part and the piston and being closed when the latter is in engagement with said drive part, said piston responding to abnormal pressure conditions in the casing for disengaging from the drive part against the action of said resilient means to thereby open the circuit and stop the motor.

5. A pumping device comprising a chamber, a fluid displacing element in the chamber, valved inlet and outlet passages into said chamber, a power drive having a moving part abutting said element for reciprocating it within said chamber, resilient means for normally maintaining the element in abutment with said part and allowing said element to move away from abutment with the part when the pressure differential between said passages reaches a predetermined degree, and means for rendering said power drive inoperative to actuate said part when the latter and said element become disengaged.

6. In combination with a suction operated windshield cleaner having a reciprocatory wiper operating part operable by suction and a suction line connecting said cleaner to the intake manifold of an engine; a device connected to said suction line for supplementing the manifold suction when the latter decreases below normal, means for setting into operation said device when the manifold suction falls below a predetermined degree and for discontinuing operation of said device when the manifold suction is normal, whereby the degree of suction effective upon the cleaner and its reciprocatory wiper operating part is limited to the manifold suction as a maximum.

7. In combination with a windshield cleaner and a source of fluid pressure for operating said cleaner, other means for operating the cleaner including an electric circuit, pressure responsive means for opening and closing said circuit to accordingly render said operating means inoperative and operative, and means for establishing fluid communication between the pressure responsive means and the source of fluid pressure.

HENRY HUEBER.